(12) United States Patent
Hong et al.

(10) Patent No.: US 7,947,803 B2
(45) Date of Patent: May 24, 2011

(54) APPARATUS AND METHOD FOR RECOVERING POLYMER

(75) Inventors: Sung-Don Hong, Daejeon Metropolitan (KR); In-Su Lee, Daejeon Metropolitan (KR); Jong-Ku Lee, Daejeon Metropolitan (KR); Sung-Ho Chun, Daejeon Metropolitan (KR); Seung-Young Park, Daejeon Metropolitan (KR); Sung-Cheol Yoon, Daejeon Metropolitan (KR)

(73) Assignee: LG Chem, Ltd., Seoul (KR)

( * ) Notice: Subject to any disclaimer, the term of this patent is extended or adjusted under 35 U.S.C. 154(b) by 70 days.

(21) Appl. No.: 12/312,857

(22) PCT Filed: Dec. 5, 2007

(86) PCT No.: PCT/KR2007/006279
§ 371 (c)(1),
(2), (4) Date: May 29, 2009

(87) PCT Pub. No.: WO2008/069569
PCT Pub. Date: Jun. 12, 2008

(65) Prior Publication Data
US 2010/0069584 A1 Mar. 18, 2010

(30) Foreign Application Priority Data
Dec. 5, 2006 (KR) .......................... 10-2006-0122400

(51) Int. Cl.
*C08F 6/00* (2006.01)
*C08G 63/02* (2006.01)

(52) U.S. Cl. .................... 528/502 R; 422/102; 422/130; 422/224; 422/225; 424/72; 424/401; 424/439; 424/443; 424/474; 528/481

(58) Field of Classification Search .................. 422/102, 422/130, 224, 225; 424/72, 401, 439, 443, 424/474; 528/481
See application file for complete search history.

(56) References Cited

U.S. PATENT DOCUMENTS

| 4,038,219 | A | * | 7/1977 | Boehm et al. ................ 521/46.5 |
| 4,400,501 | A | | 8/1983 | Lane, Jr. et al. |
| 4,414,386 | A | | 11/1983 | Lane, Jr. |
| 7,041,780 | B2 | | 5/2006 | Buckley et al. |
| 2004/0187770 | A1 | | 9/2004 | Calabrese et al. |
| 2005/0171258 | A1 | | 8/2005 | Choi et al. |

FOREIGN PATENT DOCUMENTS

| CN | 1688632 | 10/2005 |
| JP | 2006-143918 | 6/2006 |
| JP | 2006-143918 A | 6/2006 |
| KR | 10-2005-0078321 | 8/2005 |
| KR | 10-2006-0042562 | 5/2006 |

* cited by examiner

Primary Examiner — Terressa M Boykin
(74) Attorney, Agent, or Firm — McKenna Long & Aldridge LLP (57) ABSTRACT

The present invention provides an apparatus for recovering a polymer from polymer solution, and a method of recovering a polymer using the apparatus. The apparatus includes a polymer solution-storage tank for storing a polymer solution; a polymer solution feeding pump for pumping the polymer solution from the polymer solution storage tank; an antisolvent storage tank for storing an antisolvent; an antisolvent feeding pump for pumping the antisolvent from the antisolvent storage tank; a reaction chamber to which the polymer solution pumped by the polymer solution feeding pump and the antisolvent pumped by the antisolvent feeding pump are supplied; a high-speed mixer that is rotated in the reaction chamber at a speed range of 1000 to 30000 rpm, mixes the polymer solution with the antisolvent under a shearing force corresponding to a tip speed of 5 to 30 m/sec, and precipitates a polymer; and a precipitate storage tank for storing the precipitation mixture of the polymer and the solvent/antisolvent.

19 Claims, 3 Drawing Sheets

APPARATUS AND METHOD FOR RECOVERING POLYMER

TECHNICAL FIELD

The present invention relates to an apparatus for efficiently recovering polymer in the form of solid particles from a liquid polymer solution by using a high-speed mixer, and a method of recovering a polymer using the apparatus.

This application claims priority from Korean Patent Application No. 10-2006-122400 filed on Dec. 5, 2006 in the Korean Intellectual Property Office, along with Korean Application No. 10-2006-0122400, filed Dec. 5, 2006, both which are incorporated herein by reference in its entirety.

BACKGROUND ART

Among various processes of polymerization reactions, solution polymerization process is typically applied to synthesize cyclic olefins polymers, in which monomers, catalysts, and polymers are all dissolved in a solvent. The reaction begins with the monomers and the catalysts dissolved in a solvent in a reactor. With the activated catalysts the monomers are continuously added to the growing polymer chain at the catalyst active site by coordinate covalent bonding. The dissolution of the polymer in a solvent is maintained to perform the reaction in a single homogeneous liquid phase. Since the amount of polymer is gradually increased in the solution during the reaction, the viscosity of the solution is continuously increased with the reaction.

When the reaction is finished, the solution in a reactor becomes a mixture containing the polymer obtained by the synthesis, unreacted monomers, the solvent, and a small amount of catalyst. Accordingly, after the reaction, a process for selectively recovering the polymer from the solution is required. In this step, an additional solvent may be added into the reactor in order to reduce the viscosity, thus easily transporting the solution to perform post-treatment.

Generally, two different methods are commercially available to selectively recover the polymer from the solvent and the unreacted monomers in the obtained liquid phase polymer solution from solution polymerization process. Firstly, the polymer solution is dispersed as liquid drops over a large amount of liquid phase dispersion medium such as water under a condition of temperature that is the boiling point temperature of the monomer or the solvent or higher so that the residual monomers and solvent are vaporized to give coarse solid polymer particles (usually called "crumb"). Since the obtained polymer particles are wet with water, further drying process is required to get final dry polymer particles. This method, so called steam stripping process, is commercially used to recover thermo-sensitive polymers such as butadiene rubber or styrene-butadiene elastomers from the polymer solution after the polymerization reaction.

In the second method, a polymer solution is processed under the condition of high temperature and reduced pressure so that residual monomers and solvent are vaporized from the molten polymer. This method, so called devolatilization, thus requires high temperature which is identical with or higher than the melting point of the polymer and a pressure reducing device such as vacuum pump. It is commercially used to produce melt-processable polymers such as polystyrene and styrene-acrylonitrile copolymers.

Meanwhile, for cyclic olefin polymers whose monomers typically show very high boiling point temperature (150° C. or more) and polymers not having a specific melting point temperature, both of the above-mentioned methods cannot be used. In this case, a method of using the difference in solubility of polymers with respect to various organic solvents is used, and generally, a solid polymer is recovered from a polymer solution obtained after polymerization by using a precipitation phenomenon that a polymer dissolved in a solvent precipitates out in a solid form when the antisolvent having a very low solubility of polymer is added to the polymer solution.

The precipitation phenomenon means that when a polymer material dissolved in a liquid solvent is added to an antisolvent which cannot dissolve the polymer material, the polymer material is precipitated out in a solid form. The antisolvent is a material which can be mixed with the solvent of the polymer solution and has a low solubility with respect to the polymer material to be separated.

If the antisolvent is used in a sufficiently large amount, the polymer material is precipitated while coming into contact with the antisolvent. Accordingly, the precipitation phenomenon relates to a phase-conversion reaction where liquid polymer phase is rapidly converted into solid phase.

In the case of the cyclic olefin resin, the precipitation phenomenon is used in order to recover the polymer in the polymer solution synthesized after the solution polymerization.

A batch type dropping method is known in the related art. Examples of the dropping method may include a forward dropping method where a polymerization solution is added to an antisolvent as a liquid droplet, and a backward dropping method where an antisolvent is added to a polymerization solution as a liquid droplet.

In a cyclic olefin polymerization process, the above-mentioned dropping precipitation method is used and a single kind of antisolvent for complete precipitation or two kinds of antisolvents for partial precipitation followed by complete precipitation are used to perform the process.

The reason why two or more kinds of antisolvents are used during the dropping method is that it is easy to obtain the polymer in a particle form as compared to the case of a single kind of antisolvent.

First, the antisolvent for partial precipitation is added to the polymerization solution to partially precipitate the polymer. At this time, the polymerization solution is changed from a clear and transparent liquid state to a semi-transparent and frosty state. Next, a large amount of antisolvent for complete precipitation is added to completely precipitate the polymer particles.

The polymer which is dissolved in the polymerization solution is precipitated out in a solid form if the antisolvent is added thereto. In respect to the dropping method, very small solid particles are first formed during the partial precipitation, and the formed solid particles coagulate to each other to form larger size particles when the antisolvent for complete precipitation is further added.

In this case, it is presumed that the particle size is determined depending on the supply rate of the antisolvent and the rpm of an impeller in a precipitation reactor or the tip speed of the impeller.

A repulsive force against a cohesive force between particles is generated due to a shearing force from the impeller. Accordingly, if the cohesive force between particles is larger than the repulsive force generated due to the shearing force of the impeller, the particle size will be continuously increased.

Meanwhile, as the precipitation of particles reaches the complete precipitation, the cohesive force between particles is decreased. When particles have been completely precipitated, the cohesive force is hardly generated between particles since salvation effect by solvent is blocked by antisolvent.

In a dropping method, however, an antisolvent is gradually supplied onto the surface of a polymer solution, while high shearing force is generated near the impeller and a relatively low shearing force is generated on the surface of the solution.

Therefore, if particles are strongly cohered on the surface of the solution, there is a possibility that the polymer is obtained in the form of not particles but a cake.

DISCLOSURE OF INVENTION

Technical Problem

When physical properties of a synthetic polymer are slightly changed or a polymerization yield varies during the course of polymerization, precipitating a cyclic olefin polymer by using an antisolvent according to the dropping method, particularly when a content of polymer in the polymerization solution is reduced due to the reduced polymerization yield, generates problems in that precipitated particles cohere to each other to form a bulky cake and are hardened in a precipitation reactor.

Accordingly, an object of the present invention is to provide a very efficient and stable method of precipitating a polymer out in a polymer solution by using an antisolvent to recover the polymer in a particle forms, thereby providing excellent product and packaging properties.

Technical Solution

According to an embodiment of the present invention, an apparatus for recovering a polymer includes a polymer solution-storage tank for storing a polymer solution; a polymer solution feeding pump for pumping the polymer solution from the polymer solution storage tank; an antisolvent storage tank for storing an antisolvent; an antisolvent feeding pump for pumping the antisolvent from the antisolvent storage tank; a reaction chamber to which the polymer solution pumped by the polymer solution pump and the antisolvent pumped by the antisolvent pump are supplied; a high-speed mixer that is rotated in the reaction chamber at a speed range of 1000 to 30000 rpm, mixes the polymer solution with the antisolvent under a shearing force corresponding to a tip speed of 5 to 30 msec, and precipitates a polymer; and a precipitate storage tank for storing the precipitation mixture of the polymer and the antisolvent.

According to another embodiment of the present invention, a method of recovering a polymer includes pumping a polymer solution stored in a polymer solution storage tank to the outside of the polymer solution storage tank by a polymer solution feeding pump, and pumping an antisolvent stored in an antisolvent storage tank to the outside of the antisolvent storage tank by an antisolvent feeding pump; supplying the polymer solution and the antisolvent, which are pumped by the polymer solution feeding pump and the antisolvent feeding pump, respectively, to a reaction chamber; mixing the polymer solution and the antisolvent supplied to the reaction chamber and precipitating a polymer by using a high-speed mixer that is rotated in the reaction chamber at a speed range of 1000 to 30000 rpm and provides a shearing force corresponding to a tip speed of 5 to 30 msec; and discharging the precipitation mixture of the polymer and the solvent/antisolvent from the reaction chamber, and then storing the precipitation mixture in a precipitate storage tank.

Advantageous Effects

According to the present invention, it is possible to very quickly mix a polymer solution with an antisolvent under a high shearing force by using a high-speed mixer. Accordingly, it is possible to facilitate the complete precipitation of particles, thereby preventing precipitated particles from cohering. As a result, it is possible to efficiently and stably obtain a polymer in the form of particles. The particles obtained as described above have excellent product and packaging properties.

Further, it is possible to significantly reduce the amount of an antisolvent to be used. Furthermore, it is possible to achieve a precipitating operation by using only one kind of an antisolvent without using several kinds of antisolvent. Therefore, it is possible to reduce investment and operating costs during the commercial manufacturing process, and to minimize environmental pollution caused by chemicals.

BEST MODE FOR CARRYING OUT THE INVENTION

According to an embodiment of the present invention, an apparatus for recovering a polymer includes a polymer solution-storage tank for storing a polymer solution; a polymer solution feeding pump for pumping the polymer solution from the polymer solution storage tank; an antisolvent storage tank for storing an antisolvent; an antisolvent feeding pump for pumping the antisolvent from the antisolvent storage tank; a reaction chamber to which the polymer solution pumped by the polymer solution feeding pump and the antisolvent pumped by the antisolvent feeding pump are supplied; a high-speed mixer that is rotated in the reaction chamber at a speed range of 1000 to 30000 rpm, mixes the polymer solution with the antisolvent under a shearing force corresponding to a tip speed of 5 to 30 msec, and precipitates a polymer; and a precipitate storage tank for storing the precipitation mixture of the polymer and the solvent/antisolvent.

The polymer solution stored in the polymer solution storage tank may be a solution containing a cyclic olefin polymer, but is not limited thereto.

It is preferable that the solid content of the polymer solution be in the range of 5 to 50% by weight, and it is preferable that the temperature of the polymer solution be in the range of 15 to 100° C.

If the temperature of the polymer solution is excessively low, the viscosity of the polymer solution is increased. For this reason, it is difficult to feed the polymer solution to the reaction chamber. If the temperature of the polymer solution is excessively high, although the viscosity of the polymer solution is decreased, the temperature of the polymer solution may reach the boiling point of the solvent, causing the solvent to be vaporized. For this reason, pressure should be increased due to the vaporized solvent, which may cause operational troubles.

The antisolvent stored in the antisolvent storage tank may be one or more alcohol solvent selected from methanol and ethanol; one or more nonpolar solvent selected from n-hexane, cyclohexane, and heptane; or an acetone solvent.

The apparatus may further include polymer solution pipelines that connect the polymer solution storage tank with the reaction chamber and supply the polymer solution of the polymer solution storage tank to the reaction chamber therethrough; and antisolvent pipelines that connect the antisolvent storage tank with the reaction chamber and supply the antisolvent of the antisolvent storage tank to the reaction chamber therethrough.

The polymer solution feeding pump may be provided on the polymer solution pipelines, and the antisolvent feeding pump may be provided on the antisolvent pipelines.

The polymer solution feeding pump discharges the polymer solution from the polymer solution storage tank by a pumping operation, and then supplies the polymer solution to the reaction chamber through the polymer solution pipeline.

Further, the antisolvent feeding pump discharges the antisolvent from the antisolvent storage tank by a pumping operation, and then supplies the antisolvent to the reaction chamber through the antisolvent pipeline.

A volumetric ratio of the flow rate of the antisolvent, which is supplied to the reaction chamber by the antisolvent feeding pump, to the flow rate of the polymer solution, which is supplied to the reaction chamber by the polymer solution feeding pump, is preferably in the range of 0.5 to 20. However, an appropriate ratio of the flow rate may vary depending on the weight ratio of the polymer contained in the polymer solution and the characteristics of the polymer. The ratio of the flow rate may be defined as follows:

$$\text{Ratio of flow rate} = \frac{\text{flow rate of antisolvent (ml/min)}}{\text{flow rate of polymer solution (ml/min)}}$$

The polymer solution and the antisolvent, which are pumped by the polymer solution feeding pump and the antisolvent feeding pump, respectively, are supplied to the reaction chamber.

The reaction chamber is provided with a high-speed mixer that quickly mixes the polymer solution and the antisolvent, which are supplied to the reaction chamber, by a high shearing force.

In this case, it is preferable that the reaction chamber have a predetermined inner space in order to improve the shearing force of the high-speed mixer.

The high-speed mixer is rotated in the reaction chamber at a speed range of 1000 to 30000 rpm. The high-speed mixer mixes the polymer solution with the antisolvent in the reaction chamber under a shearing force corresponding to a tip speed of 5 to 30 m/sec, and precipitates the mixture in the form of a polymer.

An inline homomixer or an inline homogenizer may be used as the high-speed mixer.

The inline homomixer includes a rotor that is a rotating body, and a stator that is a stationary body, in a reaction chamber. The rotor is connected to a motor that is provided outside the reaction chamber.

Accordingly, when the rotor is rotated, a shearing force is generated in a small space formed between the rotor and the stator.

When the high-speed mixer is an inline homomixer and the polymer solution and the antisolvent are simultaneously and continuously supplied to the reaction chamber, the polymer solution and the antisolvent are mixed with each other due to a high shearing force generated in the space formed between the rotor and the stator and the polymer is precipitated. The precipitated polymer, the antisolvent, and a solvent contained in the polymer solution are continuously discharged from the reaction chamber, and then supplied to the precipitate storage tank.

When the polymer solution and the antisolvent are mixed in order to precipitate the polymer, the repulsive force against the shearing force should be increased and the polymer solution and the antisolvent should be quickly mixed with each other in order to prevent precipitated particles from being cohered to each other.

If the polymer solution and the antisolvent are mixed with each other in the reaction chamber by using the high-speed mixer of the apparatus according to the embodiment of the present invention, that is, if the polymer solution and the antisolvent come in contact with each other in the high-speed mixer for generating a high shearing force, the polymer solution and the antisolvent can be quickly mixed with each other because the polymer solution and the antisolvent come in contact with each other under the high shearing force. Further, when the polymer solution and the antisolvent are mixed with each other and the polymer is precipitated, it is possible to quickly precipitate the polymer and to prevent the precipitated particles from being cohered.

For this reason, the complete precipitation of the polymer is quickly performed. Accordingly, the precipitated particles are not cohered to each other and are in a stable state. Therefore, even though processing conditions are changed, it is possible to consistently operate the apparatus according to the embodiment of the present invention.

If the polymer solution and the antisolvent are mixed with each other under a shearing force corresponding to a tip speed of 5 to 30 msec by using the high-speed mixer in the apparatus for recovering a polymer according to the embodiment of the present invention, it is possible to solve problems occurring when the impeller of the precipitation reactor is used in the related art.

Furthermore, since a partial precipitation step which is required in a known dropping method is omitted and only an antisolvent for complete precipitation is used to form precipitation particles, a known process can be simplified to improve production efficiency. The amount of antisolvent can be reduced and stable particles can be obtained regardless of a change in reaction yield and physical properties of polymers as compared to the known dropping method.

Meanwhile, the apparatus according to the embodiment of the present invention may further include a precipitate pipeline that connects the reaction chamber with the precipitate storage tank, and supplies the precipitation mixture of the polymer precipitated due to the shearing force of the high-speed mixer and the antisolvent from the reaction chamber to the precipitate storage tank therethrough. Accordingly, the precipitation mixture of the reaction chamber is supplied to the precipitate storage tank through the precipitate pipeline, and then stored in the precipitate storage tank.

Further, the apparatus may further include a washing-drying unit for washing and drying the precipitation mixture so that the polymer is obtained in the form of solid particles from the precipitation mixture stored in the precipitate storage tank. In a washing process, a catalyst used for the polymerization is removed using wash liquid in order to improve the degree of purity of the polymer. In a drying process, the polymer that is in the form of solid particles is separated from the wash liquid so that the polymer can be packaged as a product by using a paper bag or a plastic bag.

The bulk density of the polymer, which is recovered by the apparatus according to the embodiment of the present invention, may be preferably in the range of 0.1 to 0.5 g/ml. If the bulk density of the polymer is too low, packaging costs are increased since the polymer is easily scattered in the air, which makes work difficult. If the bulk density of the polymer is too high, the polymer is not dissolved in a solution quickly enough when a solution casting film is made using the product.

The polymer, which is recovered by the apparatus according to the embodiment of the present invention, may be a cyclic olefin polymer, but is not limited thereto.

According to another embodiment of the present invention, a method of recovering a polymer includes pumping a polymer solution stored in a polymer solution storage tank to the outside of the polymer solution storage tank by a polymer solution feeding pump, and pumping an antisolvent stored in an antisolvent storage tank to the outside of the antisolvent storage tank by an antisolvent feeding pump; supplying the polymer solution and the antisolvent, which are pumped by the polymer solution feeding pump and the antisolvent feeding pump, respectively, to a reaction chamber; mixing the polymer solution and the antisolvent and precipitating a polymer by using a high-speed mixer that is rotated in the reaction chamber at a speed range of 1000 to 30000 rpm and provides a shearing force corresponding to a tip speed of 5 to 30 msec; and discharging the precipitation mixture of the polymer and the antisolvent from the reaction chamber, and then storing the precipitation mixture in a precipitate storage tank. The description of the above-mentioned apparatus according to the embodiment of the present invention is applied to the method according to this embodiment.

The method according to another embodiment of the present invention may further include washing and drying the precipitation mixture stored in the precipitate storage tank, thereby obtaining the polymer in the form of solid particles from the precipitation mixture.

The present invention will be described in detail with reference to accompanying drawings.

Figure 1:
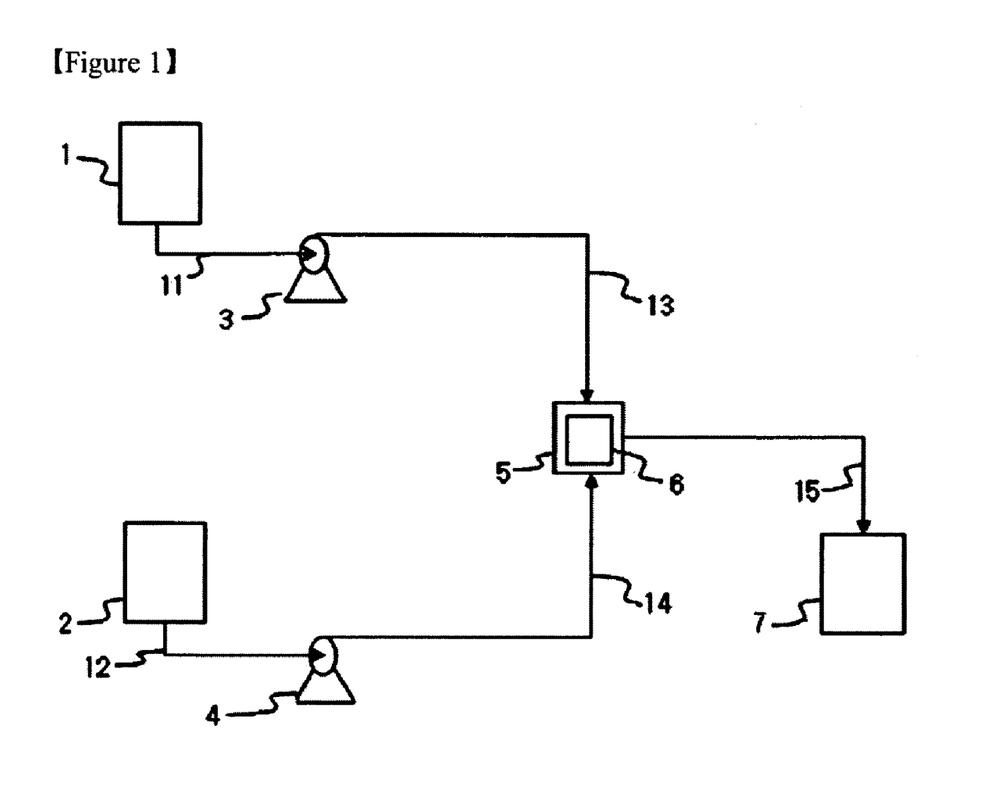
FIG. 1 is a view showing the configuration of an apparatus for recovering a polymer according to an embodiment of the present invention.

As shown in FIG. 1, an apparatus for recovering a polymer according to an embodiment of the present invention includes a polymer solution-storage tank 1 for storing a polymer solution; a polymer solution feeding pump 3 for pumping the polymer solution from the polymer solution storage tank 1; an antisolvent storage tank 2 for storing an antisolvent; an antisolvent feeding pump 4 for pumping the antisolvent from the antisolvent storage tank 2; a reaction chamber 5 to which the polymer solution pumped by the polymer solution feeding pump 3 and the antisolvent pumped by the antisolvent feeding pump 4 are supplied; a high-speed mixer 6 that is rotated in the reaction chamber 5 at a speed range of 1000 to 30000 rpm, mixes the polymer solution and the antisolvent supplied to the reaction chamber 5 under a shearing force corresponding to a tip speed of 5 to 30 msec, and precipitates the mixture in the form of a polymer; and a precipitate storage tank 7 that is provided in the reaction chamber 5, and stores the precipitation mixture of the polymer and the antisolvent.

The apparatus according to the embodiment of the present invention may further include polymer solution pipelines 11 and 13 that connect the polymer solution storage tank 1 with the reaction chamber 5 and supply the polymer solution of the polymer solution storage tank 1 to the reaction chamber 5 therethrough; and antisolvent pipelines 12 and 14 that connect the antisolvent storage tank 2 with the reaction chamber 5 and supply the antisolvent of the antisolvent storage tank 2 to the reaction chamber 5 therethrough.

In this case, the polymer solution pipelines 11 and 13 may be composed of a first polymer solution pipeline 11 that connects the polymer solution storage tank 1 with the polymer solution feeding pump 3, and a second polymer solution pipeline 13 that connects the polymer solution feeding pump 3 with the reaction chamber 5.

The antisolvent pipelines 12 and 14 may be composed of a first antisolvent pipeline 12 that connects the antisolvent storage tank 2 with the antisolvent feeding pump 4, and a second antisolvent pipeline 14 that connects the antisolvent feeding pump 4 with the reaction chamber 5.

Further, the apparatus according to the embodiment of the present invention may further include a precipitate pipeline 15. The precipitate pipeline 15 connects the reaction chamber 5 with the precipitate storage tank 7, and supplies the precipitation mixture of the polymer and the solvent/antisolvent from the reaction chamber 5 to the precipitate storage tank 7 therethrough.

Furthermore, the apparatus may further include a washing-drying unit (not shown). The washing-drying unit washes and dries the precipitation mixture so that the polymer is obtained in the form of solid particles from the precipitation mixture stored in the precipitate storage tank 7.

The operation of the apparatus for recovering a polymer according to the embodiment of the present invention will be described below.

The polymer solution feeding pump 3 and the antisolvent feeding pump 4 are operated, so that the polymer solution is discharged from the polymer solution storage tank 1 and the antisolvent is discharged from the antisolvent storage tank 2. Then, the polymer solution and the antisolvent are supplied to the reaction chamber 5 through the polymer solution pipelines 11 and 13 and the antisolvent pipelines 12 and 14.

The polymer solution and the antisolvent, which are supplied to the reaction chamber 5, are quickly mixed by the high-speed mixer 6. In this case, the high-speed mixer 6 is rotated in the reaction chamber 5 at a speed range of 1000 to 30000 rpm, and mixes the polymer solution and the antisolvent under a shearing force corresponding to a tip speed of 5 to 30 msec. At this time, shear rate of the high-speed mixer 6 is 5,000~30,000 sec$^{-1}$. At this time, the shear rate of the high-speed mixer 6 corresponds to 5,000~30,000 sec$^{-1}$.

As the polymer is precipitated, the precipitation mixture of the polymer and antisolvent remains in the reaction chamber 5.

Then, the precipitation mixture of the polymer and the solvent/antisolvent, which is received in the reaction chamber 5, is supplied from the reaction chamber 5 to the precipitate storage tank 7 through the precipitate pipeline 15.

After that, the precipitation mixture stored in the precipitate storage tank 7 is discharged from the precipitate storage tank, and then washed and dried by the washing-drying unit (not shown). As a result, the polymer is obtained in the form of solid particles.

As described above, it is possible to easily recover the polymer from the polymer solution by the apparatus according to the embodiment of the present invention.

Mode for the Invention

The present invention will be described in more detail below with reference to examples. The examples are used to exemplify the present invention, and the scope of the present invention is not limited to the examples. The present invention may be modified in various ways by those skilled in the art, without departing from the scope and spirit thereof.

Examples 1 to 4

Precipitation of a 5-norbornene-2-allyl acetate Polymerization Solution Using Ethanol as a Single Kind of Antisolvent The 5-norbornene-2-allyl acetate polymer solution (solvent: toluene) was prepared in the polymerization solution storage tank 1. The total solid content of the polymerization solution was 11.9% by weight. The industrial ethanol (purity 99%) was prepared in the antisolvent storage tank 2. The 5-norbornene-2-allyl acetate polymer solution (solvent: toluene) of the polymerization solution storage tank 1 and the industrial ethanol (purity 99%) of the antisolvent storage tank 2 were supplied to a reaction chamber 5 by using the polymerization solution feeding pump 3 and the antisolvent feeding pump 4. The flow rate of the antisolvent feeding pump 4 was controlled so that the flow rate of the industrial ethanol (purity 99%) was 514 ml/min, and the flow rate of the polymerization solution feeding pump 3 was controlled so that the flow rate of the polymerization solution was 177 ml/min.

Figure 2:
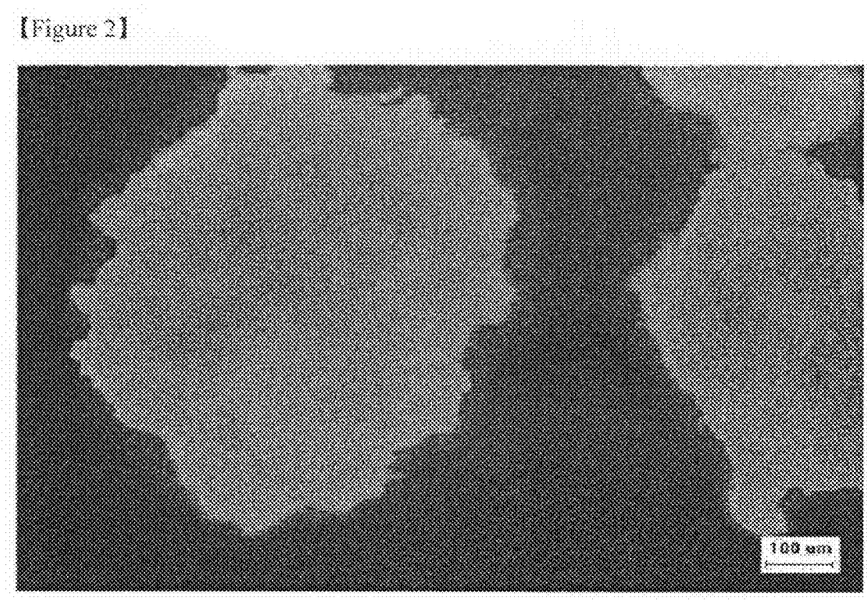
FIG. 2 is a photograph, which taken by an optical microscope, of the form of particles of polymer obtained from Example 3 of the present invention.

Further, the inline homomixer 5 was operated in the reaction chamber 5 at a speed of 3000, 5000, 8000, and 12000 rpm, respectively. When the inline homomixer began to be operated, the polymer was precipitated in the form of particles by the inline homomixer 5 and was then mixed with a anitsolvent. This precipitation mixture was stored in the precipitation mixture storage tank 6. The precipitation mixture of the precipitation mixture storage tank 6 was washed and dried. As a result, the precipitation polymer was obtained in the form of final solid particles. Operational conditions and bulk density of the particles obtained under the operational conditions were shown in Table 1. Further, a photograph, which taken by an optical microscope, of the form of particles of polymer obtained from Example 3 was shown in FIG. 2.

TABLE 1

|  | RPM (1/min) | Tip speed (m/sec) | Bulk density (g/ml) |
|---|---|---|---|
| Example 1 | 3000 | 6 | 0.41 |
| Example 2 | 5000 | 10 | 0.44 |
| Example 3 | 8000 | 16 | 0.33 |
| Example 4 | 12000 | 24 | 0.40 |

Examples 5 to 9

Precipitation of a 5-norbornene-2-allyl acetate Polymerization Solution Using n-hexane as a Single Kind of Antisolvent The 5-norbornene-2-allyl acetate polymerization solution (solvent: toluene) was prepared in the polymerization solution storage tank 1. The total solid content of the polymerization solution was 16.6% by weight. The industrial n-hexane (purity 99%) was prepared in the antisolvent storage tank 2. The 5-norbornene-2-allyl acetate polymerization solution (solvent: toluene) of the polymerization solution storage tank 1 and the industrial n-hexane (purity 99%) of the antisolvent storage tank 2 were supplied to a reaction chamber 5 by using the polymerization solution feeding pump 3 and the antisolvent feeding pump 4. The flow rate of the antisolvent feeding pump 4 was controlled so that the flow rate of the industrial n-hexane (purity 99%) was 79, 94, and 190 ml/min, and the flow rate of the polymerization solution feeding pump 3 was controlled so that the flow rate of the polymerization solution was 160 ml/min.

Figure 3:
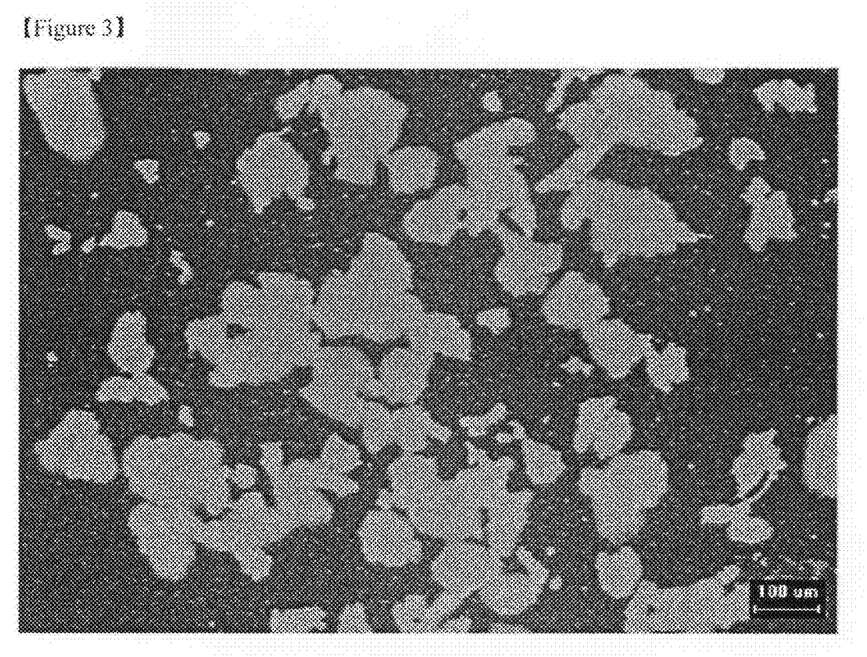
FIG. 3 is a photograph, which taken by an optical microscope, of the form of particles of polymer obtained from Example 5 of the present invention.

Then, the inline homomixer 5 was operated in the reaction chamber 5 at a speed of 12000 or 15000 rpm. When the inline homomixer began to be operated, the polymer was precipitated in the form of particles by the inline homomixer 5 and was then mixed with a antisolvent. This precipitation mixture was stored in the precipitation mixture storage tank 6. The precipitation mixture of the precipitation mixture storage tank 6 was washed and dried. As a result, the precipitation polymer was obtained in the form of final solid particles. Operational conditions and bulk density of the particles obtained under the operational conditions were shown in Table 1. Further, a photograph, which taken by an optical microscope, of the form of particles of polymer obtained from Example 5 was shown in FIG. 3.

TABLE 2

|  | Flow rate of n-hexane (ml/min) | PRM (1/min) | Tip speed (m/sec) | Bulk density (g/ml) |
|---|---|---|---|---|
| Example 5 | 79 | 12000 | 24 | 0.35 |
| Example 6 | 79 | 15000 | 30 | 0.35 |
| Example 7 | 94 | 12000 | 24 | 0.29 |
| Example 8 | 94 | 15000 | 30 | 0.29 |
| Example 9 | 190 | 15000 | 30 | 0.12 |

Hereinafter, a description will be given of precipitation of a 5-norbornene-2-allyl acetate polymer and a copolymer of 5-norbornene-2-allyl acetate and 5-norbornene-2-methyl ester according to the known backward dropping method and the method of the present invention using the above-mentioned high-speed mixer.

First, when the exo/endo ratio of the 5-norbornene-2-allyl acetate polymer was changed from 30:70 to 40:60, the 5-norbornene-2-allyl acetate polymerization solution (solvent: toluene, solid content: 16.6% by weight) was precipitated according to the known backward dropping method and the method of the present invention using the above-mentioned high-speed mixer. A detailed description will be given of the precipitations which were performed by using different methods.

Comparative Example 1

Precipitation Phenomenon with Respect to the Change in Exo/Endo Ratio of the 5-norbornene-2-allyl acetate Polymer In Comparative Example 1, the 5-norbornene-2-allyl acetate polymerization solution (solvent: toluene, solid content: 16.6% by weight) was precipitated while the exo/endo ratio of 5-norbornene-2-allyl acetate polymer was changed from 30:70 to 40:60 according to the known backward dropping method, and the precipitation phenomenon was analyzed. The exo/endo ratio was determined by analyzing the polymer using the $^{13}$C-NMR.

When the exo/endo ratio of the 5-norbornene-2-allyl acetate polymer was 30:70, acetone was first slowly dropped onto the vessel containing the polymerization solution in an amount that was 6 times as high as the solid content of the polymerization solution. Thus, the partial precipitation phenomenon occurred and the polymerization solution became frosty. n-hexane was slowly dropped onto the solution mixture in an amount that was 10 times as high as the solid content of the polymerization solution to completely precipitate the particles. The bulk density of the obtained particles was in the range of 0.2 to 0.4 g/ml. The tip speed of the impeller was in the range of about 2 to 3 m/sec during the precipitation. When the exo/endo ratio of the 5-norbornene-2-allyl acetate polymer was 40:60, the precipitate particles were not obtained by using the above-mentioned procedure and cohered each other to form a cake.

Example 10

The procedure of Comparative Example 1 was repeated except that the inline homomixer was used. Like Example 10, the precipitation was performed by using the inline homomixer to obtain the precipitate particles regardless of a change in exo/endo ratio. The bulk density of the obtained precipitate particles was in the range of 0.1 to 0.4 g/ml.

Hereinafter, a description will be given of precipitation of the 5-norbornene-2-allyl acetate polymerization solution (solvent: toluene, solid content: 16.6% by weight) according to the known backward dropping method and the method of the present invention using the above-mentioned high-speed mixer when the yield of the 5-norbornene-2-allyl acetate polymer was reduced from 95% to 85%. The yield was defined by the percentage of the value that was obtained by dividing the weight of the polymer obtained after the precipitation by the initial weight of the monomer.

Comparative Example 2

Precipitation Phenomenon with Respect to the Reduction in Yield of the 5-norbornene-2-allyl acetate Polymer When the yield of the 5-norbornene-2-allyl acetate polymer was 95% or more, cyclohexane was first slowly dropped onto the vessel containing the polymerization solution in an amount that was one time as high as the solid content of the polymerization solution. Thus, the partial precipitation phenomenon occurred and the polymerization solution became frosty. n-hexane was slowly dropped onto the solution mixture in an amount that was 4 times as high as the solid content of the polymerization solution to completely precipitate the particles. The bulk density of the obtained particles was in the range of 0.2 to 0.4 g/ml. The tip speed of the impeller was in the range of about 2 to 3 m/sec during the precipitation. When the yield of the 5-norbornene-2-allyl acetate polymer was 85%, the precipitate particles were not obtained by using the above-mentioned procedure and cohered each other to form a cake.

Example 11

The procedure of Comparative Example 2 was repeated except that the inline homomixer was used. Like Example 11, the precipitation was performed by using the inline homomixer to obtain the precipitate particles regardless of a change in yield. The bulk density of the obtained precipitate particles was in the range of 0.3 to 0.4 g/ml.

Comparative Example 3

Precipitation Phenomenon of the Copolymer of 5-norbornene-2-allyl acetate and 5-norbornene-2-methyl ester In respects to the copolymer of 5-norbornene-2-allyl acetate and 5-norbornene-2-methyl ester, the precipitate particles were not obtained by using the known backward dropping method regardless of the copolymerization ratio.

Example 12

The procedure of Comparative Example 3 was repeated except that the inline homomixer was used. Like Example 12, the precipitation was performed by using the inline homomixer to obtain the precipitated particles regardless of the type of copolymer or the copolymerization ratio. The bulk density of the obtained precipitate particles was in the range of 0.3 to 0.4 g/ml.

The invention claimed is:

1. An apparatus for recovering a polymer, the apparatus comprising:
    a polymer solution-storage tank for storing a polymer solution;
    a polymer solution feeding pump for pumping the polymer solution from the polymer solution storage tank;
    an antisolvent storage tank for storing an antisolvent;
    an antisolvent feeding pump for pumping the antisolvent from the antisolvent storage tank;
    a reaction chamber to which the polymer solution pumped by the polymer solution pump and the antisolvent pumped by the antisolvent pump are supplied;
    a high-speed mixer that is rotated in the reaction chamber at a speed range of 1000 to 30000 rpm, mixes the polymer solution with the antisolvent under a shearing force corresponding to a tip speed of 5 to 30 m/sec, and precipitates a polymer; and
    a precipitate storage tank for storing the precipitation mixture of the polymer and the solvent/antisolvent,
    wherein the precipitate polymer is a cyclic olefin polymer.
2. The apparatus according to claim 1, wherein the solid content of the polymer solution stored in the polymer solution storage tank is in the range of 5 to 50% by weight.
3. The apparatus according to claim 1, wherein the temperature of the polymer solution stored in the polymer solution storage tank is in the range of 15 to 100° C.
4. The apparatus according to claim 1, wherein the antisolvent stored in the antisolvent storage tank is one or more alcohol solvent selected from methanol and ethanol; one or more nonpolar solvent selected from n-hexane, cyclohexane, and heptane; or an acetone solvent.
5. The apparatus according to claim 1, further comprising:
    polymer solution pipelines that connect the polymer solution storage tank with the reaction chamber and supply the polymer solution of the polymer solution storage tank to the reaction chamber therethrough; and
    antisolvent pipelines that connect the antisolvent storage tank with the reaction chamber and supply the antisolvent of the antisolvent storage tank to the reaction chamber therethrough.
6. The apparatus according to claim 5, wherein the polymer solution feeding pump is provided on the polymer solution pipelines, and
    the antisolvent feeding pump is provided on the antisolvent pipelines.
7. The apparatus according to claim 1, wherein a volumetric ratio of the flow rate of the antisolvent, which is supplied to the reaction chamber by the antisolvent pump, to the flow rate of the polymer solution, which is supplied to the reaction chamber by the polymer solution pump, is in the range of 0.5 to 20.
8. The apparatus according to claim 1, wherein the high-speed mixer is an inline homomixer or an inline homogenizer.
9. The apparatus according to claim 1, further comprising:
    a precipitate pipeline that connects the reaction chamber with the precipitate storage tank, and supplies the precipitation mixture of the polymer and the antisolvent from the reaction chamber to the precipitate storage tank therethrough.
10. The apparatus according to claim 1, wherein the bulk density of the polymer is in the range of 0.1 to 0.5 g/ml.
11. The apparatus according to claim 1, further comprising:
    a washing-drying unit for washing and drying the precipitation mixture so that the polymer is obtained in the form of solid particles from the precipitation mixture stored in the precipitate storage tank.

12. A method of recovering a polymer, the method comprising:

pumping a polymer solution stored in a polymer solution storage tank to the outside of the polymer solution storage tank by a polymer solution feeding pump, and pumping an antisolvent stored in an antisolvent storage tank to the outside of the antisolvent storage tank by an antisolvent feeding pump;

supplying the polymer solution and the antisolvent, which are pumped by the polymer solution feeding pump and the antisolvent feeding pump, respectively, to a reaction chamber;

mixing the polymer solution and the antisolvent supplied to the reaction chamber and precipitating a polymer by using a high-speed mixer that rotates in the reaction chamber at a speed range of 1000 to 30000 rpm and provides a shearing force corresponding to a tip speed of 5 to 30 msec; and discharging the precipitation mixture of the polymer and the solvent/antisolvent from the reaction chamber, and then storing the precipitation mixture in a precipitate storage tank, wherein the precipitated polymer is a cyclic olefin polymer.

13. The method according to claim 12, wherein the solid content of the polymer solution stored in the polymer solution storage tank is in the range of 5 to 50% by weight.

14. The method according to claim 12, wherein the temperature of the polymer solution stored in the polymer solution storage tank is in the range of 15 to 100° C.

15. The method according to claim 12, wherein the antisolvent stored in the antisolvent storage tank is one or more alcohol solvent selected from methanol and ethanol; one or more nonpolar solvent selected from n-hexane, cyclohexane, and heptane; or an acetone solvent.

16. The method according to claim 12, wherein a ratio of the flow rate of the antisolvent, which is supplied to the reaction chamber by the antisolvent feeding pump, to the flow rate of the polymer solution, which is supplied to the reaction chamber by the polymer solution feeding pump, is in the range of 0.5 to 20.

17. The method according to claim 12, wherein the high-speed mixer is an inline homomixer or an inline homogenizer.

18. The method according to claim 12, wherein the bulk density of the polymer is in the range of 0.1 to 0.5 g/Ml.

19. The method according to claim 12, further comprising:

washing and drying the precipitation mixture stored in the precipitate storage tank, thereby obtaining the polymer in the form of solid particles from the precipitation mixture.

* * * * *